US012468527B2

(12) United States Patent
Yagi

(10) Patent No.: US 12,468,527 B2
(45) Date of Patent: Nov. 11, 2025

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Yuichi Yagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/971,919

(22) Filed: Oct. 24, 2022

(65) Prior Publication Data

US 2023/0132494 A1 May 4, 2023

(30) Foreign Application Priority Data

Nov. 2, 2021 (JP) ................................. 2021-179730

(51) Int. Cl.
*G06F 8/654* (2018.01)
(52) U.S. Cl.
CPC .................................... *G06F 8/654* (2018.02)
(58) Field of Classification Search
CPC .................................................... G06F 8/654
See application file for complete search history.

(56) References Cited

U.S. PATENT DOCUMENTS

2004/0123282 A1* 6/2004 Rao .......................... G06F 8/654
711/165
2004/0215755 A1* 10/2004 O'Neill .................... G06F 8/658
717/170
2005/0132091 A1* 6/2005 Shibata ...................... G06F 8/65
710/4
2005/0204353 A1* 9/2005 Ji .............................. G06F 8/658
717/168
2010/0031246 A1* 2/2010 Meller ..................... G06F 8/654
717/173
2012/0144378 A1* 6/2012 Shah ......................... G06F 8/60
717/170
2012/0254599 A1* 10/2012 Kim ...................... G06F 9/4401
713/1
2015/0007161 A1* 1/2015 Yagi ......................... G06F 8/65
717/171

(Continued)

FOREIGN PATENT DOCUMENTS

JP 2006127393 A 5/2006

*Primary Examiner* — Wei Y Zhen
*Assistant Examiner* — Brahim Bourzik
(74) *Attorney, Agent, or Firm* — ROSSI, KIMMS & McDOWELL LLP

(57) ABSTRACT

An information processing apparatus obtains first update firmware data from a server apparatus, holds the first update firmware data in a volatile storage medium, and stores version information of the first update firmware data in a non-volatile storage medium. The apparatus performs an update process of updating the firmware stored in the non-volatile storage medium, using the first update firmware data held in the volatile storage medium. The apparatus restores the firmware from an error state that accompanies the update process being abnormally terminated, based on second update firmware data, and decides whether or not to obtain update firmware data corresponding to the stored version information from the server apparatus based on the stored version information after the restoration.

10 Claims, 11 Drawing Sheets

(56) References Cited

U.S. PATENT DOCUMENTS

2016/0036814 A1* 2/2016 Conrad ................ H04L 9/0891
  713/171
2016/0231997 A1* 8/2016 Mihara .................... G06F 8/65

* cited by examiner

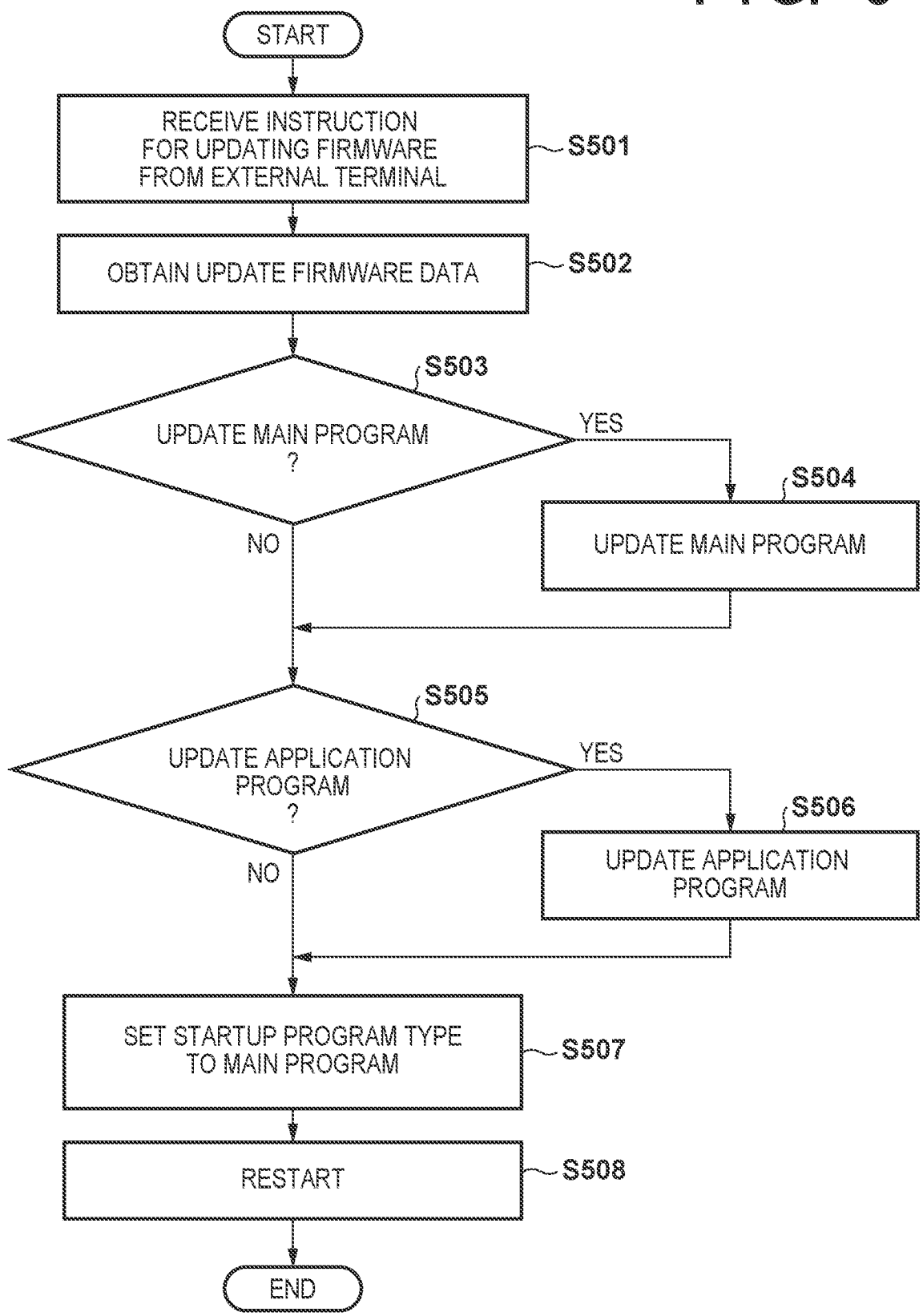

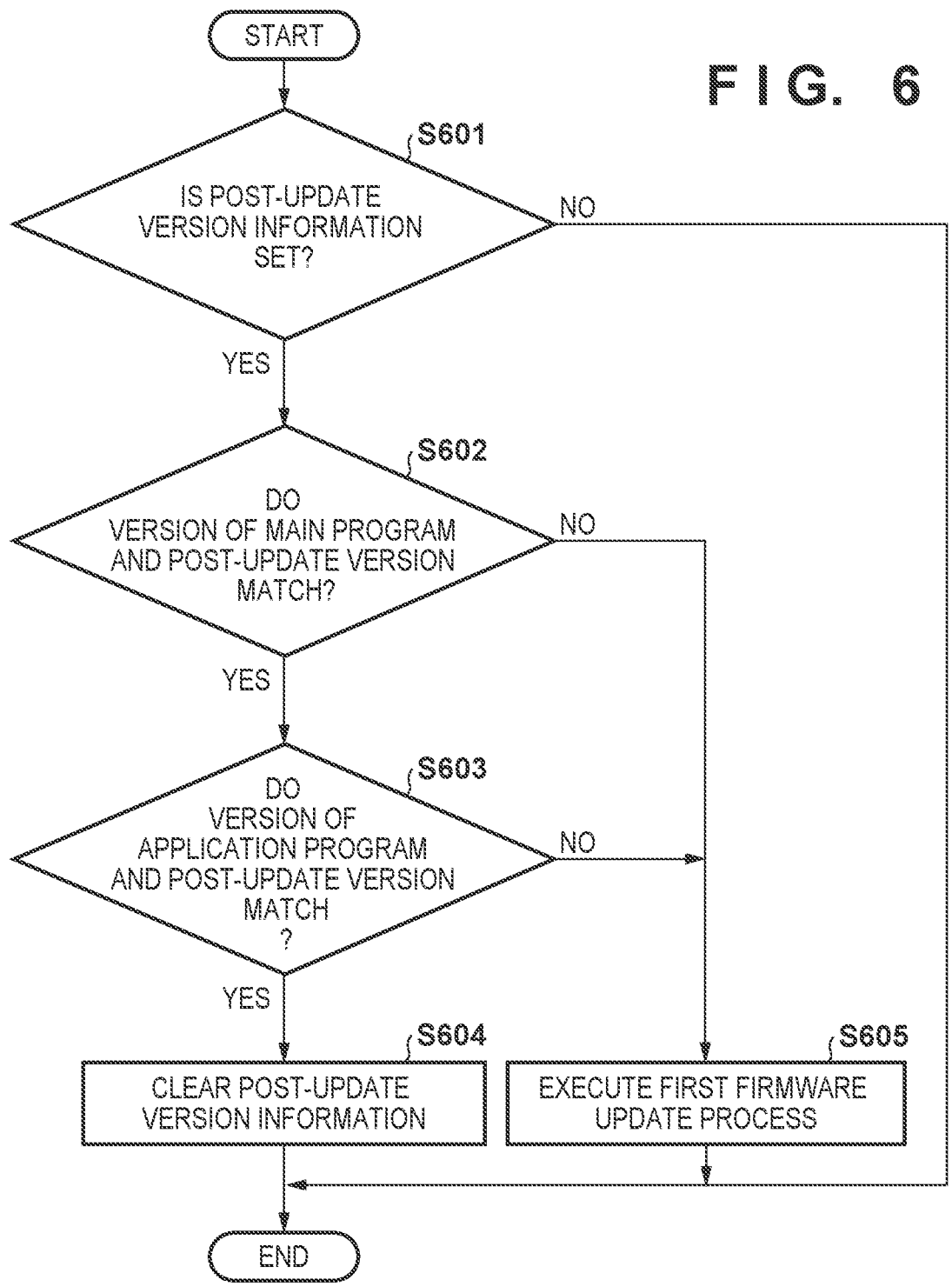

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium.

Description of the Related Art

Conventionally, various apparatuses, such as information processing apparatuses, operate based on a main program, such as firmware. Recently, apparatuses that download the latest firmware data from a server and update their firmware using the downloaded data have become popular (e.g., Japanese Patent Laid-Open No. 2006-127393).

In addition, in recent years, various reductions in production cost have been considered for apparatuses in response to demands of the market for cheaper products. One example of a reduction in production cost is a reduction in capacities of flash memories. In apparatuses with a reduced flash memory capacity, when updating firmware, a temporary storage area for backing up data that has been downloaded from a server cannot be secured in a storage area of the flash memory. In this case, a process for updating firmware can be performed by using a volatile memory as such a temporary storage area and sequentially writing data over the firmware that is currently being used.

For example, in an apparatus in which a temporary storage area cannot be secured in the flash memory and a process for updating firmware is performed using a volatile memory as a temporary storage area as described above, if the power of the apparatus is interrupted while an update process is being executed, the update process will be abnormally terminated. As a result, the firmware goes into an error state. As a method of resolving such a firmware error state, there is a method of connecting an external apparatus, such as a PC on which a restoration tool is installed, and performing work for restoring the apparatus.

However, in a case of restoring firmware from an error state by a distributed restoration tool, the post-restoration version of the firmware is not necessarily the version to which the user was intending to update (a post-update version that the user was intending to update to). In such a case, it is desirable that the version of the firmware after restoring the firmware from an error state can be made the post-update version that the user was intending to update to.

SUMMARY OF THE INVENTION

Therefore, the present invention provides a technique for enabling, in an information processing apparatus, the post-restoration version of firmware to be made to be an appropriate version after restoring the firmware from an error state that accompanies a process for updating firmware being abnormally terminated.

According to one aspect of the present invention, there is provided an information processing apparatus comprising: a non-volatile storage medium storing firmware; a volatile storage medium capable of temporarily holding data; an obtainment unit configured to obtain first update firmware data from a server apparatus, hold the first update firmware data in the volatile storage medium, and store version information of the first update firmware data in the non-volatile storage medium; an update unit configured to perform an update process of updating the firmware stored in the non-volatile storage medium, using the first update firmware data held in the volatile storage medium; a restoration unit configured to restore the firmware from an error state that accompanies the update process being abnormally terminated, based on second update firmware data; and a decision unit configured to decide whether or not to obtain update firmware data corresponding to the stored version information from the server apparatus based on the stored version information after the restoration.

According to another aspect of the present invention, there is provided a method of controlling an information processing apparatus that comprises a non-volatile storage medium storing firmware, and a volatile storage medium capable of temporarily holding data, the method comprising: obtaining first update firmware data from a server apparatus, holding the first update firmware data in the volatile storage medium, and storing version information of the first update firmware data in the non-volatile storage medium; performing an update process of updating the firmware stored in the non-volatile storage medium, using the first update firmware data held in the volatile storage medium; restoring the firmware from an error state that accompanies the update process being abnormally terminated, based on second update firmware data; and deciding whether or not to obtain update firmware data corresponding to the stored version information from the server apparatus based on the stored version information after the restoration.

According to still another aspect of the present invention, there is provided a non-transitory computer-readable storage medium storing a computer program for causing a computer to execute a method of controlling an information processing apparatus that comprises a non-volatile storage medium storing firmware, and a volatile storage medium capable of temporarily holding data, the method comprising: obtaining first update firmware data from a server apparatus, holding the first update firmware data in the volatile storage medium, and storing version information of the first update firmware data in the non-volatile storage medium; performing an update process of updating the firmware stored in the non-volatile storage medium, using the first update firmware data held in the volatile storage medium; restoring the firmware from an error state that accompanies the update process being abnormally terminated, based on second update firmware data; and deciding whether or not to obtain update firmware data corresponding to the stored version information from the server apparatus based on the stored version information after the restoration.

Further features of the present invention will become apparent from the following description of exemplary embodiments (with reference to the attached drawings).

BRIEF DESCRIPTION OF THE DRAWINGS

FIG. 5 is a flowchart for explaining an example of a procedure for a second firmware update process.

FIG. 6 is a flowchart for explaining an example of a procedure for a process that is performed as a part of a startup process by a main program.

DESCRIPTION OF THE EMBODIMENTS

Figure 1:
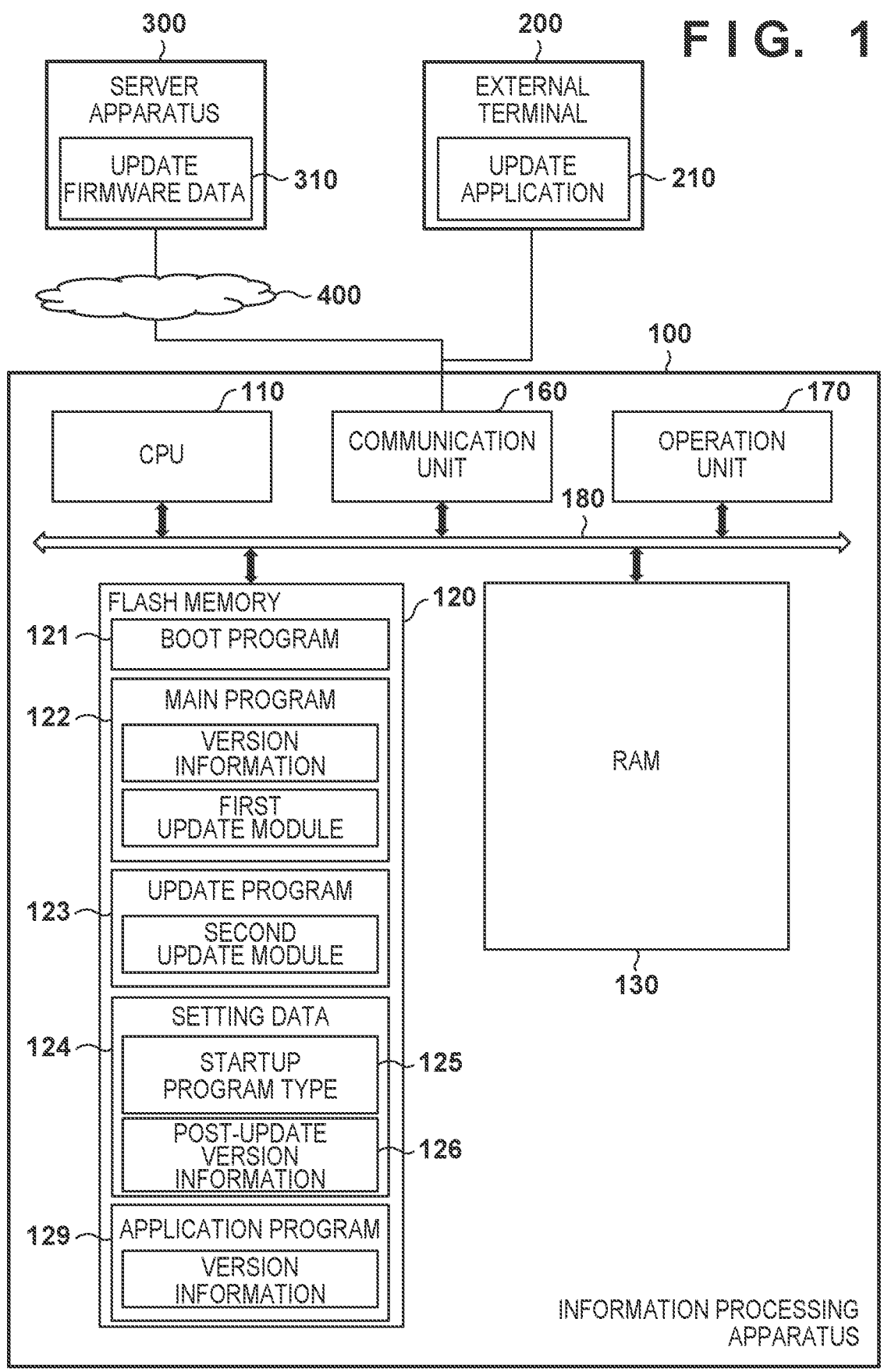
FIG. 1 is a block diagram illustrating an example of a configuration of an information processing system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a block diagram illustrating an example of a configuration of an information processing apparatus according to an embodiment of the present invention. An information processing apparatus 100 includes a CPU 110, a flash memory 120, a RAM 130, a communication unit 160, and an operation unit 170. The respective devices in the information processing apparatus 100 are connected to each other via a system bus 180.

The flash memory 120 is a non-volatile storage medium and stores various programs and various data. In the example of FIG. 1, the flash memory 120 stores a boot program 121, a main program 122 (firmware), an update program 123, setting data 124, and an application program 129. Although an example in which the above-described programs and data are stored in one flash memory 120 is illustrated in the present embodiment, a plurality of flash memories (non-volatile storage media) may be used for storing the above-described programs and data.

The boot program 121 is a program that is started first after the power of the information processing apparatus 100 has been turned on. The main program 122 is a program (firmware) for controlling main functions of the information processing apparatus 100. The update program 123 is a program for controlling updating of the firmware of the information processing apparatus 100. In the present embodiment, the update program 123 may be used as a restoration program for restoring the firmware from an error state that accompanies a first firmware update process being abnormally terminated, which will be described later. The setting data 124 is used for executing various programs by the CPU 110. The application program 129 can be called by the main program 122 and is a program for controlling respective functions of the information processing apparatus 100 (e.g., controlling an input device and an output device).

The RAM 130 is a memory (storage medium) that is provided separately from the flash memory 120 and is a volatile storage medium that is capable of temporarily holding data. Therefore, when the power of the information processing apparatus 100 is turned off, the data held in the RAM 130 is lost. The CPU 110 controls respective device in the information processing apparatus 100 by reading out programs stored in the flash memory 120 into the RAM 130 and executing the programs. The CPU 110 also uses the RAM 130 to temporarily hold data that is necessary for executing the programs.

The communication unit 160 is a communication interface (I/F) for communicating with external apparatuses. The communication unit 160 communicates with an external apparatus (e.g., a server apparatus 300) via a communication network, such as the Internet 400. Further, when an external apparatus (e.g., an external terminal 200) is connected to the information processing apparatus 100, the communication unit 160 performs communication with that external apparatus. In the present embodiment, the external terminal 200 is described as being directly connected to the information processing apparatus 100 but may be connected to the information processing apparatus 100 via a communication network, such as a wired or wireless LAN.

The operation unit 170 receives an operation from a user and transmits contents of the received operation to the CPU 110. Further, the operation unit 170 has a display unit (display) and displays a screen on the display unit in accordance with an instruction from the CPU 110.

In the present embodiment, as illustrated in FIG. 1, the setting data 124 includes a setting of a startup program type 125, which is a type of a program to be started by the boot program 121 (that is, a program to be started when the information processing apparatus 100 is started). The boot program 121, which is executed by the CPU 110 when starting the information processing apparatus 100, selects a program to be started (startup program) in accordance with the setting of the startup program type 125 included in the setting data 124. In the present embodiment, the main program 122 (firmware) or the update program 123 (restoration program) is selected as the startup program. The CPU 110 loads a program selected by the boot program 121 to the RAM 130 and executes it. At that time, the CPU 110 uses the RAM 130 to temporarily hold data that is necessary for executing the program.

In the present embodiment, the setting data 124 further includes a setting of post-update version information 126, which indicates the version of the firmware of the information processing apparatus 100 after an update process that uses update firmware data, which has been obtained from the server apparatus 300, has been completed. The post-update version information 126 stores the version information of the update firmware data, which has been obtained from the server apparatus 300. The post-update version corresponds to the version to which the user was intending to update (the version that was originally the target of the update).

As will be described later, the post-update version information 126 is used to determine whether or not update firmware data needs to be obtained by the main program 122 when the information processing apparatus 100 is started. In the present embodiment, the post-update version information 126 is used to decide whether or not to obtain, from the server apparatus 300, update firmware data that corresponds to the post-update version information 126 after restoring the firmware from an error state that accompanies the first firmware update process being abnormally terminated.

The information processing apparatus 100 of the present embodiment can communicate with the server apparatus 300 via the Internet 400 and can obtain update firmware data 310 from the server apparatus 300. The server apparatus 300 is a server for a manufacturer, an administrator, or the like of the information processing apparatus 100 to manage the update firmware data 310 for the information processing apparatus 100. The update firmware data 310 is published on the Internet 400. The main program 122 (firmware) stored in the flash memory 120 is updated by a process for updating firmware in which the update firmware data 310 is used (the first firmware update process). If necessary, the update firmware data 310 is also used to update the application program 129 stored in the flash memory 120.

Each of the main program 122 and the application program 129 stored in the flash memory 120 includes version information, which indicates the version of the program. The main program 122 includes a first update module for obtaining the update firmware data 310 by connecting to the server apparatus 300 and performing the first firmware update process for updating the firmware using the obtained data.

The information processing apparatus 100 of the present embodiment can further perform a process for updating the firmware with the update program 123 (a second firmware update process). When the information processing apparatus 100 and the external terminal 200 are connected, the update program 123 performs a process for updating the firmware of the information processing apparatus 100 according to an instruction from an update application 210, which is executed in the external terminal 200. The update program 123 includes a second update module for performing the second firmware update process for updating the firmware using update firmware data obtained from the external terminal 200. In the present embodiment, the second firmware update process is performed for restoring the firmware (main program 122) from an error state that accompanies the first firmware update process being abnormally terminated.

The update application 210, which is executed in the external terminal 200, includes a control program for communicating with the information processing apparatus 100. The update application 210 includes a function of providing the information processing apparatus 100 with update firmware data that is held by the external terminal 200 and causing the update program 123 to execute a process for updating the firmware using that data. The update application 210 can also obtain the update firmware data 310 from the server apparatus 300 and provide the obtained data to the information processing apparatus 100.

The information processing apparatus 100 may be configured as an image forming apparatus (e.g., a printing apparatus, a printer, a copying machine, a multi-function peripheral (MFP), or a facsimile apparatus) or an image processing apparatus.

<First Firmware Update Process>

Next, the first firmware update process in the information processing apparatus 100 will be described in more detail. In the present embodiment, when the user instructs that the firmware of the information processing apparatus 100 be updated via the operation unit 170 while the main program 122 is operating, the CPU 110 performs the first firmware update process. For example, the CPU 110 receives such an instruction for updating firmware from the user via an operation screen that is displayed on the operation unit 170 by the first update module, which is included in the main program 122.

When an instruction for updating firmware is received from the user, the CPU 110 connects to the server apparatus 300 via the communication unit 160 and confirms whether there is the update firmware data 310. If the update firmware data 310, which is held by the server apparatus 300, is found, the CPU 110 performs the first firmware update process. That update process rewrites programs stored in the flash memory 120 with programs included in the update firmware data 310.

Figure 3:
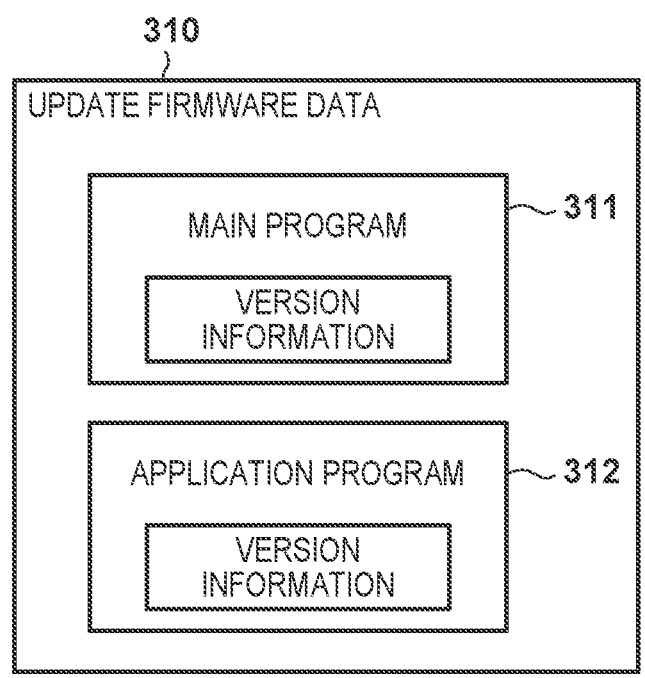
FIG. 3 is a diagram illustrating an example of a configuration of update firmware data.

FIG. 3 illustrates an example of a configuration of the update firmware data 310. The update firmware data 310 includes an update main program 311 and an update application program 312. Each of the main program 311 and application program 312 contains version information, which indicates the version of the program.

In the first firmware update processing, the CPU 110 connects to the server apparatus 300 via the communication unit 160, obtains the update firmware data 310 from the server apparatus 300, and temporarily stores the obtained data in the RAM 130. After obtaining the update firmware data 310, the CPU 110 sets the startup program type 125 included in the setting data 124 to "update program" (restoration program). Then, when it is necessary to update the main program 122, the CPU 110 rewrites the main program 122 stored in the flash memory 120 with the main program 311 included in the update firmware data 310. Then, when it is necessary to update the application program 129, the CPU 110 rewrites the area of the application program 129 stored in the flash memory 120 with an application program 312 included in the update firmware data 310.

When the programs have been rewritten (updated) as described above, the CPU 110 sets the startup program type 125 included in the setting data 124 to "main program" (firmware) and restarts the information processing apparatus 100. By the startup program type 125 being set to "main program", the main program 122 is selected as the startup program by the boot program 121 at the time of a restart. Thus, the CPU 110 starts by loading the updated main program 122 from the flash memory 120 to the RAM 130.

In the first firmware update process, for example, when the power of the information processing apparatus 100 is interrupted while the firmware (main program 122) is being rewritten, the rewriting of the firmware may be interrupted in an incomplete state. That is, the firmware update process may be abnormally terminated. In such a case, when the information processing apparatus 100 is started next time, the state is such that the startup program type 125 included in the setting data 124 is set to "update program". Thus, the update program 123 is selected as the startup program by the boot program 121, and the CPU 110 starts by loading the update program 123 to the RAM 130. Then, the CPU 110 executes the second firmware update process, which will be described later, with the update program 123.

<Second Firmware Update Process>

Next, the second firmware update process in the information processing apparatus 100 will be described in more detail. After starting the update program 123 as described above, the CPU 110 waits for an instruction for updating firmware from the update application 210 which is being executed in the external terminal 200. Upon receiving an instruction for updating firmware from the external terminal 200, the CPU 110 executes the second firmware update process by a second update module included in the update program 123.

Specifically, the CPU 110 receives the update firmware data 310 from the external terminal 200 via the communication unit 160 and temporarily stores the received data in the RAM 130. Then, the CPU 110 rewrites the main program 122 stored in the flash memory 120 with the main program 311 included in the update firmware data 310.

Finally, the CPU 110 sets the startup program type 125 included in the setting data 124 to "main program" and restarts the information processing apparatus 100. By the startup program type 125 being set to "main program", the main program 122 is selected as the startup program by the boot program 121 at the time of a restart. Thus, the CPU 110 starts by loading the updated main program 122 from the flash memory 120 to the RAM 130.

<Procedure for Process by Boot Program>

Figure 2:
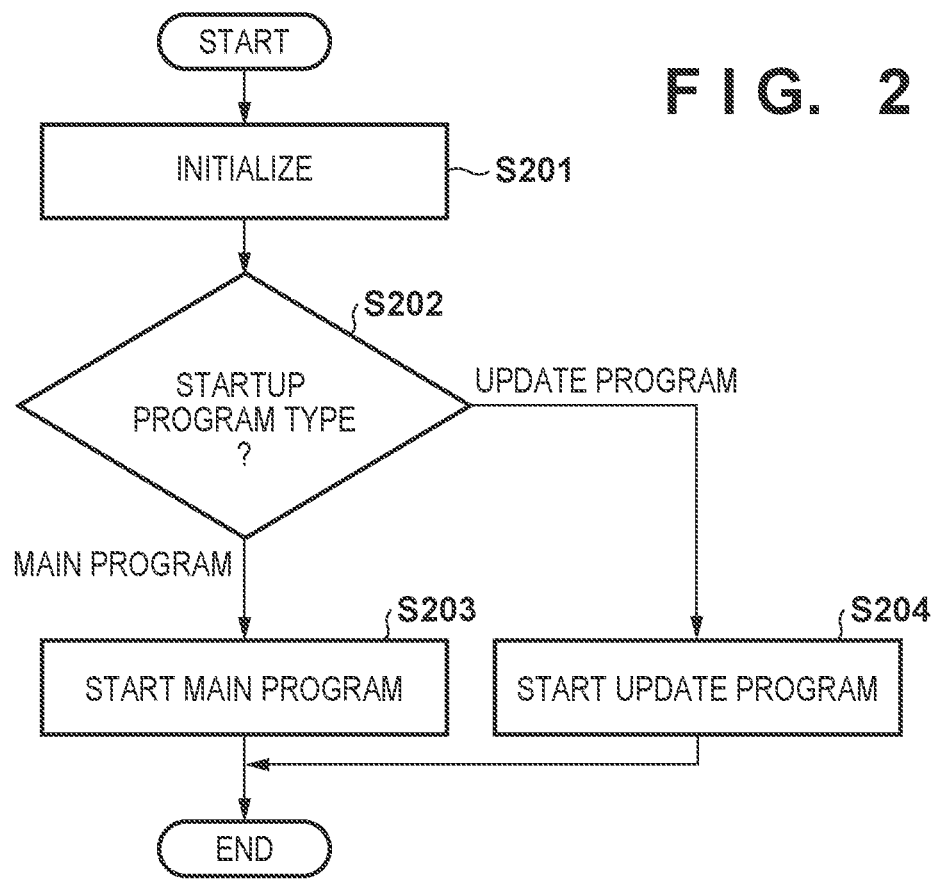
FIG. 2 is a flowchart for explaining an example of a procedure for a boot process by a boot program.

FIG. 2 is a flowchart for explaining an example of a procedure for a process for starting a program (a boot process) by the boot program 121. A process of the respective steps of FIG. 2 is realized in the information processing apparatus 100 by the CPU 110 reading out the boot program 121 from the flash memory 120 and executing it.

In step S201, the CPU 110 initializes the respective devices of the information processing apparatus 100 and advances the process to step S202. In step S202, the CPU 110 determines the type of the program to be started based on the setting data 124 stored in the flash memory 120. More specifically, the CPU 110 determines the type of the program to be started by confirming the setting of the startup program type 125 included in the setting data 124. If the program to be started is set to the main program 122 (firmware), the CPU 110 advances the process to step S203, and if the program to be started is set to the update program 123 (restoration program), the CPU 110 advances the process to step S204.

In step S203, the CPU 110 starts by loading the main program 122 from the flash memory 120 to the RAM 130 and then ends the process. Meanwhile, in step S204, the CPU 110 starts by loading the update program 123 from the flash memory 120 to the RAM 130 and then ends the process.

<Procedure for First Firmware Update Process>

Figure 4:
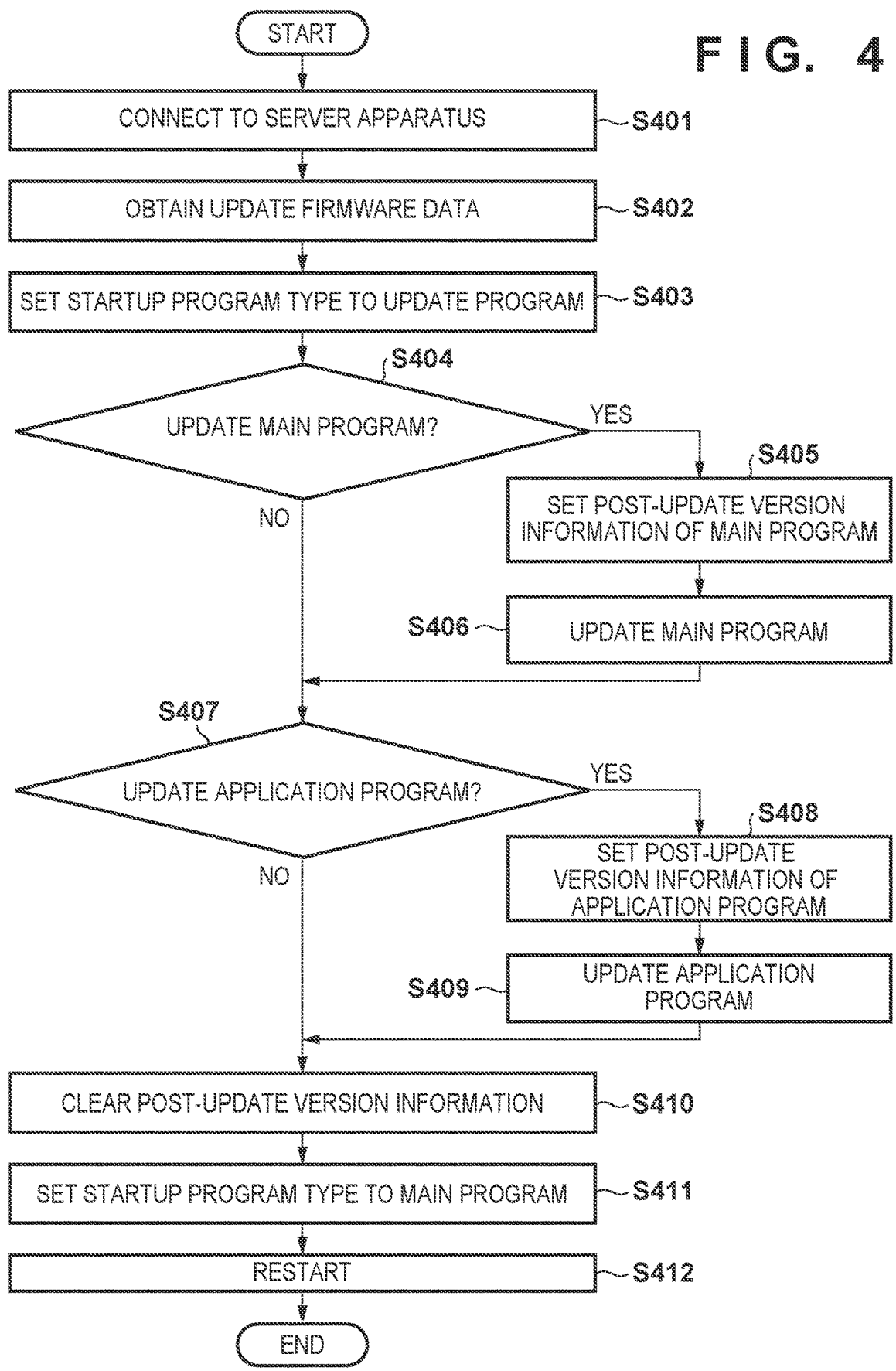
FIG. 4 is a flowchart for explaining an example of a procedure for a first firmware update process.

FIG. 4 is a flowchart for explaining an example of a procedure for the first firmware update process by the first update module of the main program 122. When the CPU 110 (main program 122) receives an instruction for updating firmware via the operation unit 170 or determines on its own that firmware needs to be updated, the CPU 110 performs the first firmware update process according to the following procedure by the first update module.

In the following process, the CPU 110 obtains the update firmware data 310 (first update firmware data) from the server apparatus 300 and holds the data in the RAM 130 (volatile storage medium). The CPU 110 further stores the version information of the update firmware data 310 as the post-update version information 126 in the flash memory 120 (non-volatile storage medium). The CPU 110 performs an update process of updating the firmware of the flash memory 120 using the update firmware data 310 held in the RAM 130.

Specifically, first, in step S401, the CPU 110 connects to the server apparatus 300 via the communication unit 160, and in step S402, the CPU 110 obtains the update firmware data 310 from the server apparatus 300 and temporarily stores the obtained data in the RAM 130. Then, in step S403, the CPU 110 sets the startup program type 125 included in the setting data 124 to "update program" such that the update program 123 is started after the information processing apparatus 100 is restarted and advances the process to step S404.

In step S404, the CPU 110 determines whether the main program 122 needs to be updated. Specifically, the CPU 110 compares the version of the main program 122 stored in the flash memory 120 with the version of the main program 311 included in the update firmware data 310. As a result of the comparison, if the main program 311 included in the update firmware data 310 is of a newer version, the CPU 110 determines that the main program 122 needs to be updated and advances the process to step S405. Otherwise, the CPU 110 determines that there is no need to update the main program 122 and advances the process to step S407.

In step S405, the CPU 110 sets the version of the main program 311 of the update firmware data 310 as the post-update version information 126. Thus, the CPU 110 stores the version information of the update firmware data in the flash memory 120 as the post-update version information 126 prior to starting the firmware update process using the obtained update firmware data 310. Further, in step S406, the CPU 110 extracts the main program 311 from the update firmware data 310 temporarily stored in the RAM 130 and writes it to the storage area of the main program 122 in the storage area of the flash memory 120. Thus, the main program 122 (firmware) stored in the flash memory 120 is updated. When the update is complete, the CPU 110 advances the process to step S407.

In step S407, the CPU 110 determines whether the application program 129 needs to be updated. Specifically, the CPU 110 compares the version of the application program 129 stored in the flash memory 120 with the version of the application program 312 included in the update firmware data 310. As a result of the comparison, if the application program 312 included in the update firmware data 310 is of a newer version, the CPU 110 determines that the application program 129 needs to be updated and advances the process to step S408. Otherwise, the CPU 110 determines that there is no need to update the application program 129 and advances the process to step S410.

In step S408, the CPU 110 sets the version of the application program 312 of the update firmware data 310 as the post-update version information 126. Further, in step S409, the CPU 110 extracts the application program 312 from the update firmware data 310 temporarily stored in the RAM 130 and writes it to the storage area of the application program 129 in the storage area of the flash memory 120. Thus, the application program 129 stored in the flash memory 120 is updated. When the update is complete, the CPU 110 advances the process to step S410.

In step S410, the CPU 110 clears the post-update version information 126 that has been set (recorded) in steps S405 and S408. Next, in step S411, the CPU 110 sets the startup program type 125 included in the setting data 124 to "main program." Then, in step S412, the CPU 110 restarts the information processing apparatus 100 and terminates the process. When the information processing apparatus 100 is restarted, a program (the main program 122) set in the startup program type 125 is selected and started by the boot program 121.

<Procedure for Second Firmware Update Process>

FIG. 5 is a flowchart for explaining an example of a procedure for a process for updating the firmware by the second update module of the update program 123. As described above, when the information processing apparatus 100 is started from a power-off state while the startup program type 125 is set to "update program", the update program 123 is started by the boot program 121. The CPU 110 (update program 123) performs the second firmware update process according to the following procedure by the second update module. In the present embodiment, the following processing is executed as a process for restoring based on the second update firmware data the firmware (main program 122) from an error state that accompanies the above-described first firmware update process being abnormally terminated.

When the CPU 110 receives an instruction for updating firmware from the external terminal 200 via the communication unit 160 in step S501, in step S502, the CPU 110 obtains the update firmware data 310 from the external terminal 200. The CPU 110 temporarily stores the update firmware data 310 obtained from the external terminal 200 in the RAM 130 and advances the process to step S503.

In step S503, the CPU 110 determines whether the main program 122 needs to be updated. Specifically, the CPU 110 compares the version of the main program 122 stored in the flash memory 120 with the version of the main program 311 included in the update firmware data 310. As a result of the comparison, if the main program 311 included in the update firmware data 310 is of a newer version, the CPU 110 determines that the main program 122 needs to be updated and advances the process to step S504. Otherwise, the CPU 110 determines that there is no need to update the main program 122 and advances the process to step S505.

In step S504, the CPU 110 extracts the main program 311 from the update firmware data 310 temporarily stored in the RAM 130 and writes it to the storage area of the main program 122 in the storage area of the flash memory 120. Thus, the main program 122 (firmware) stored in the flash memory 120 is updated. When the update is complete, the CPU 110 advances the process to step S505.

In step S505, the CPU 110 determines whether the application program 129 needs to be updated. Specifically, the CPU 110 compares the version of the application program 129 stored in the flash memory 120 with the version of the application program 312 included in the update firmware data 310. As a result of the comparison, if the application program 312 included in the update firmware data 310 is of a newer version, the CPU 110 determines that the application program 129 needs to be updated and advances the process to step S506. Otherwise, the CPU 110 determines that there is no need to update the application program 129 and advances the process to step S507.

In step S506, the CPU 110 extracts the application program 312 from the update firmware data 310 temporarily stored in the RAM 130 and writes it to the storage area of the application program 129 in the storage area of the flash memory 120. Thus, the application program 129 stored in the flash memory 120 is updated. When the update is complete, the CPU 110 advances the process to step S507.

In step S507, the CPU 110 sets the startup program type 125 included in the setting data 124 to "main program." Then, in step S508, the CPU 110 restarts the information processing apparatus 100 and terminates the process. When the information processing apparatus 100 is restarted, a program (the main program 122) set in the startup program type 125 is selected and started by the boot program 121.

<Startup Process by Main Program>

FIG. 6 is a flowchart for explaining an example of a procedure for a process that is performed as a part of a startup process by the main program 122 when the main program 122 is started by the boot program 121. In the procedure of FIG. 6, if the version of a program stored in the flash memory 120 does not match the post-update version indicated by the post-update version information 126, the first firmware update process is performed on the program whose version does not match.

First, in step S601, the CPU 110 refers to the setting data 124 and determines whether or not the post-update version information 126 is set. If the post-update version information 126 is not set, the CPU 110 terminates the process, and if it is set, the CPU 110 advances the process to step S602. The post-update version information 126 is set (recorded in the setting data 124) in steps S405 and S408.

In step S602, the CPU 110 determines whether or not the version of the main program 122 stored in the flash memory 120 matches the post-update version indicated by the post-update version information 126. If the versions match, the CPU 110 advances the process to step S603, and if they do not match, the CPU 110 advances the process to step S605.

In step S603, the CPU 110 determines whether or not the version of the application program 129 stored in the flash memory 120 matches the post-update version indicated by the post-update version information 126. If the versions match, the CPU 110 advances the process to step S604, and if they do not match, the CPU 110 advances the process to step S605.

Here, the above version mismatch occurs in the following case. For example, assume a case where the power is interrupted while the main program 122 (firmware) of the flash memory 120 is being rewritten in the first firmware update process (FIG. 4), resulting in the rewriting of the main program 122 being interrupted in an incomplete state. That is, assume a case where the first firmware update process is abnormally terminated and, in conjunction with the abnormal termination, the firmware goes into an error state. In this case, as described above, the second firmware update process (FIG. 5) is executed as a process for restoring the firmware from an error state that accompanies the first firmware update process being abnormally terminated. At this time, if the version of the main program 311 included in the update firmware data 310 provided from the external terminal 200 is older than the version of the main program 311 included in the update firmware data 310 used in the interrupted first firmware update process, the above-described version mismatch occurs.

The mismatch of versions of the application program 129 similarly occurs as follows. Assume that the power is interrupted while the application program 129 of the flash memory 120 is being rewritten in the first firmware update process (FIG. 4), resulting in the rewriting of the application program 129 being interrupted in an incomplete state. In this case, as described above, the second firmware update process (FIG. 5) is executed. At this time, if the version of the application program 312 included in the update firmware data 310 provided from the external terminal 200 is older than the version of the application program 312 included in the update firmware data 310 used in the interrupted first firmware update process, the above-described version mismatch occurs.

Then, in step S605, the CPU 110 executes the first firmware update process (FIG. 4), in which the update firmware data 310 is obtained from the server apparatus 300 and used, and terminates the process. In the first firmware update process, an update process is performed for a program (at least one of the main program 122 and the application program 129) in which a version mismatch, such as described above, has occurred.

Meanwhile, in step S604, the CPU 110 clears the post-update version information 126 and terminates the process according to the procedure of FIG. 6.

In the present embodiment, in step S605, the CPU 110 obtains the update firmware data corresponding to the post-update version information 126 from the server apparatus 300 and performs a process for updating firmware. This makes it possible for the version of the firmware (main program 122) after an update process to be the version of the firmware to which the user was intending to update (the version that was originally the target of the update). When the version that was originally the target of the update is the latest version, the update firmware data obtained from the server apparatus 300 includes the firmware of the latest version.

As described above, after restoring the firmware from an error state (by the second firmware update process), the CPU 110 decides based on the post-update version information 126 whether or not to obtain from the server apparatus 300 the update firmware data corresponding to the version information (step S602). Specifically, if the version of the main program 122 of the flash memory 120 does not match the version indicated by the post-update version information 126 stored in the flash memory 120, the CPU 110 decides to obtain the update firmware data. Meanwhile, if the version of the main program 122 of the flash memory 120 matches the version indicated by the post-update version information 126 stored in the flash memory 120, the CPU 110 decides not to obtain the update firmware data. Further, the CPU 110 clears the post-update version information 126 stored in the flash memory 120.

The CPU 110 obtains from the server apparatus 300 the update firmware data corresponding to the post-update version information 126 in accordance with the decision and performs the firmware update process using the obtained update firmware data (step S605).

<Examples of Firmware Update Process>

Figure 7A:
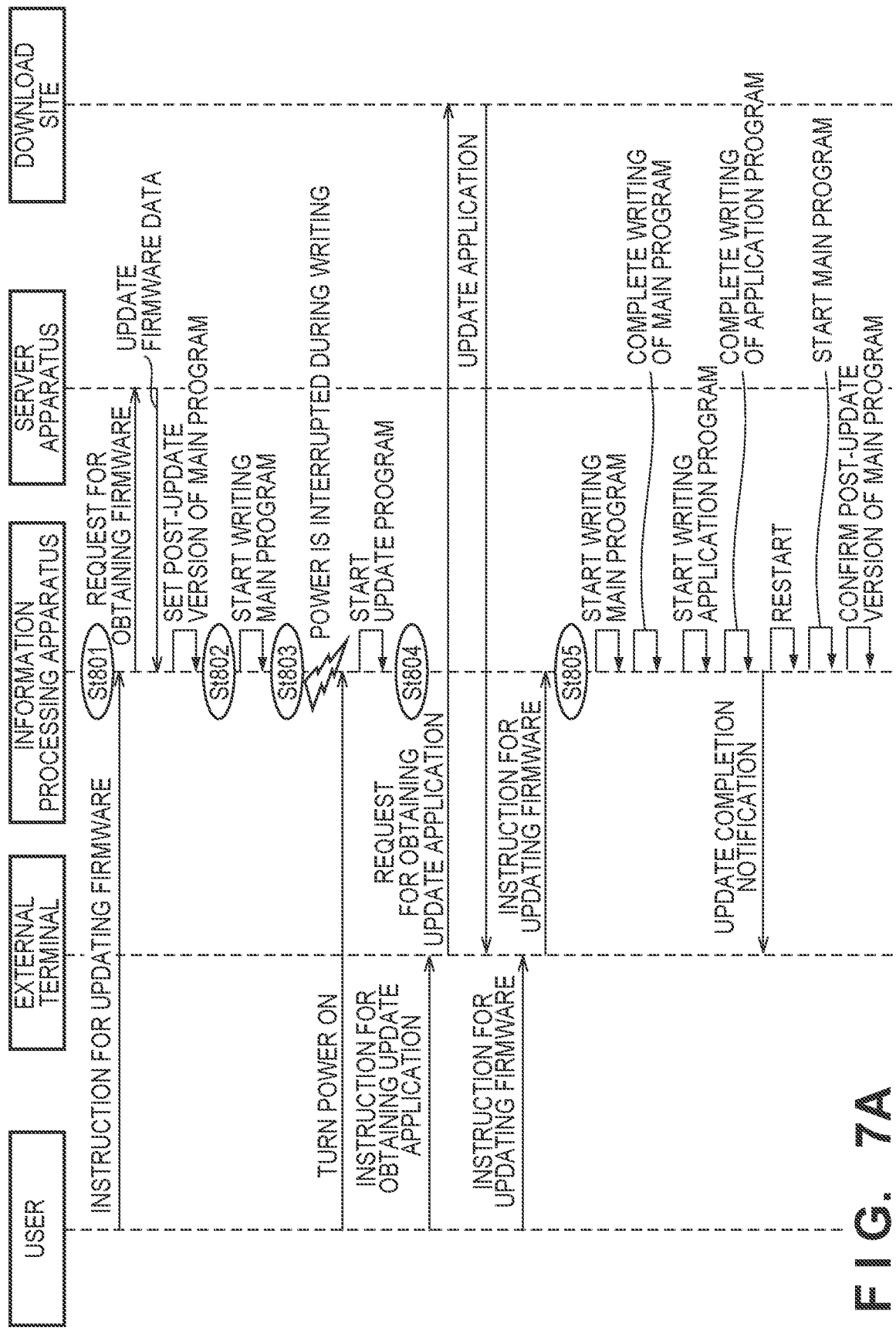
FIGS. 7A and 7B are diagrams illustrating an example of a sequence of processes for updating firmware of an information processing apparatus.
Figure 7B:
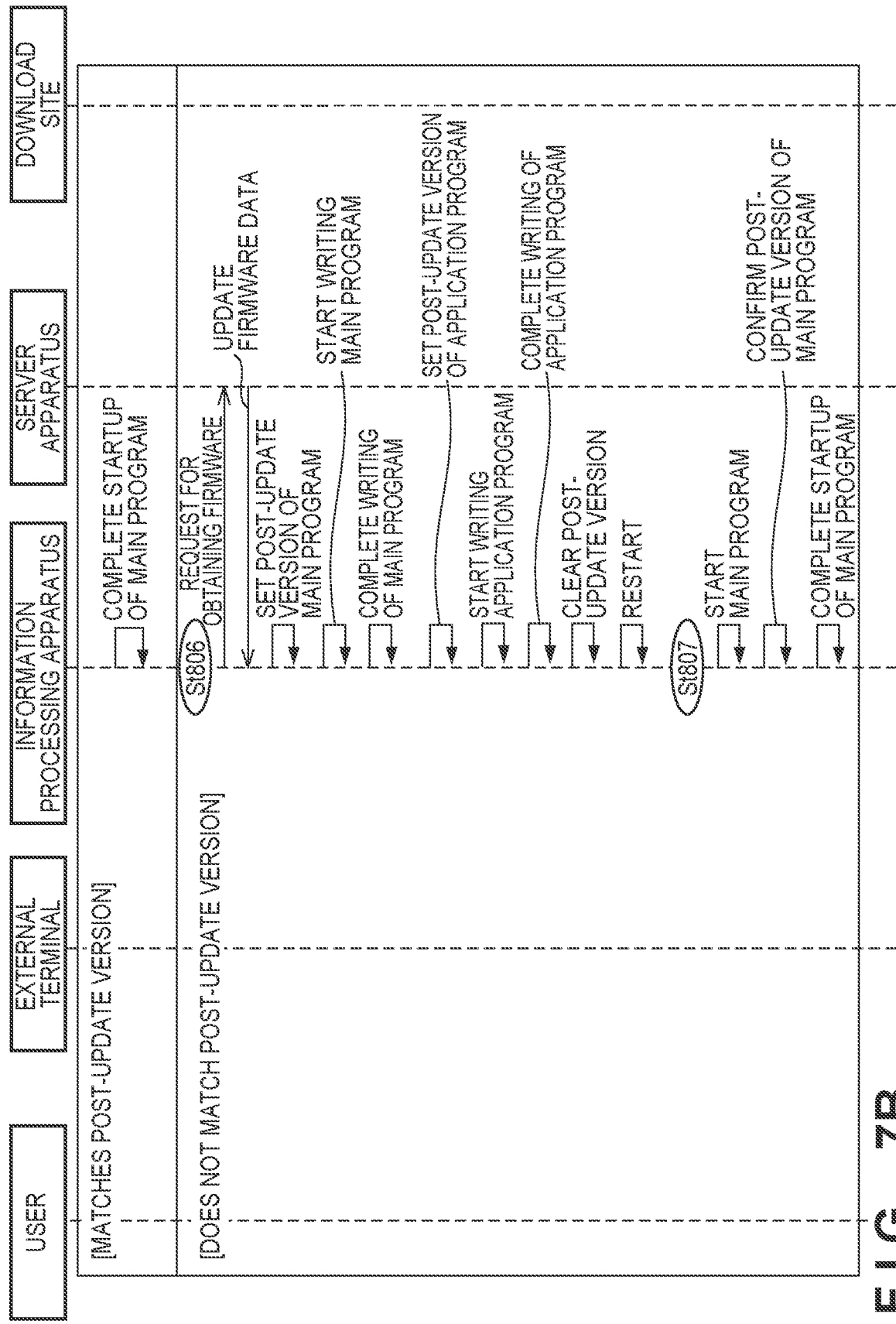
Figure 8A:
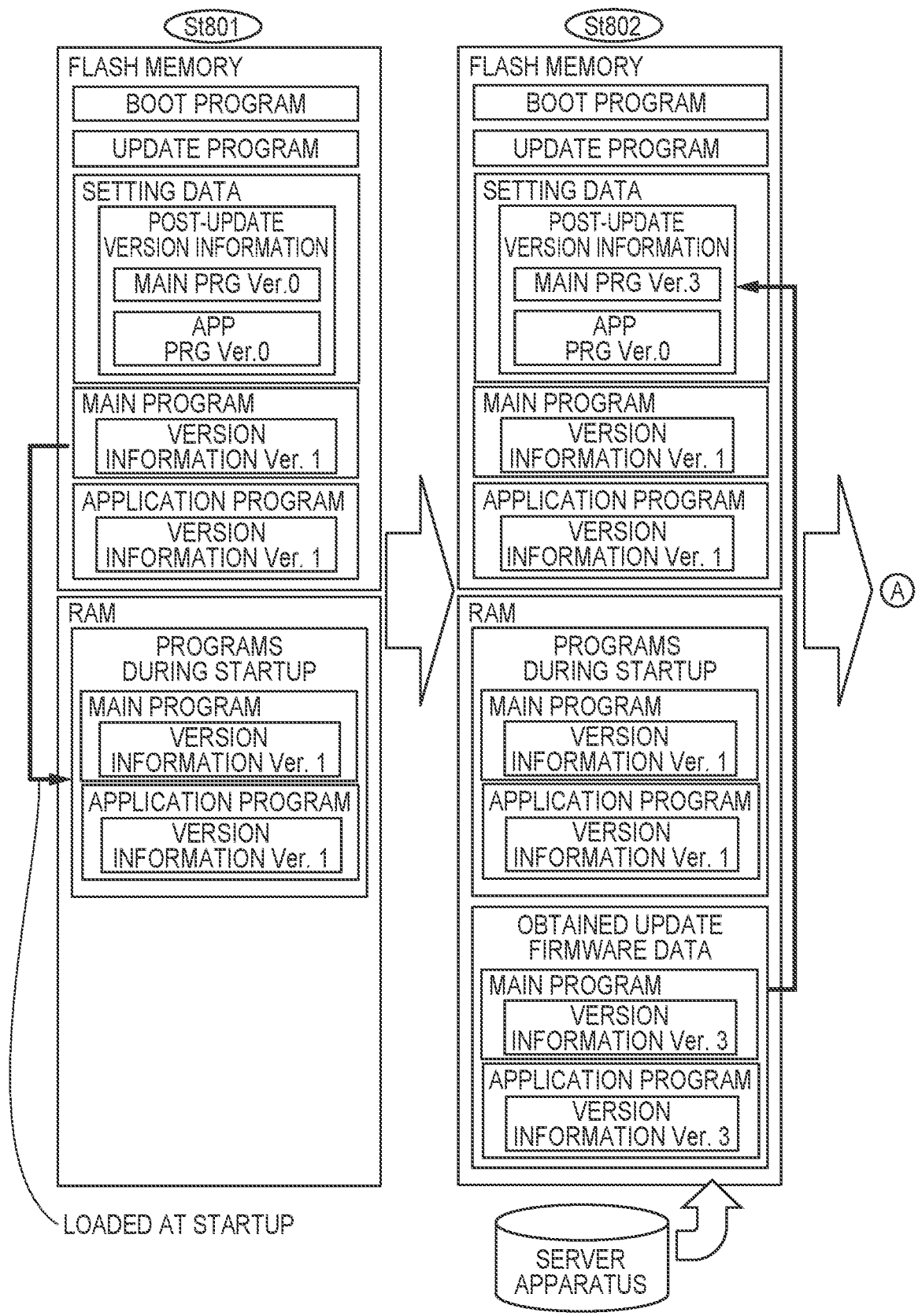
FIGS. 8A to 8D are diagrams illustrating an example of states of storage areas of a flash memory and a RAM in the information processing apparatus.
Figure 8B:
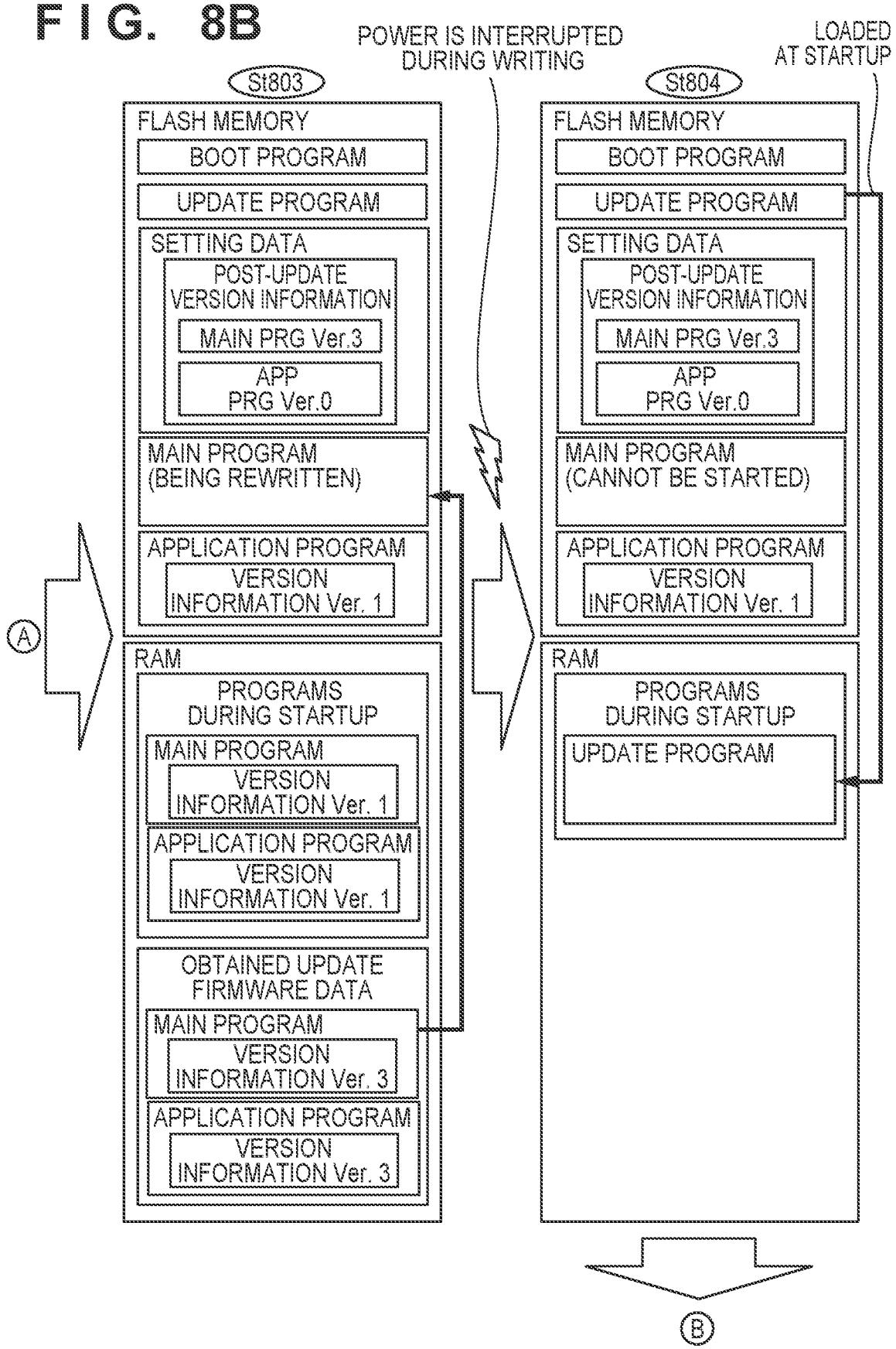
Figure 8C:
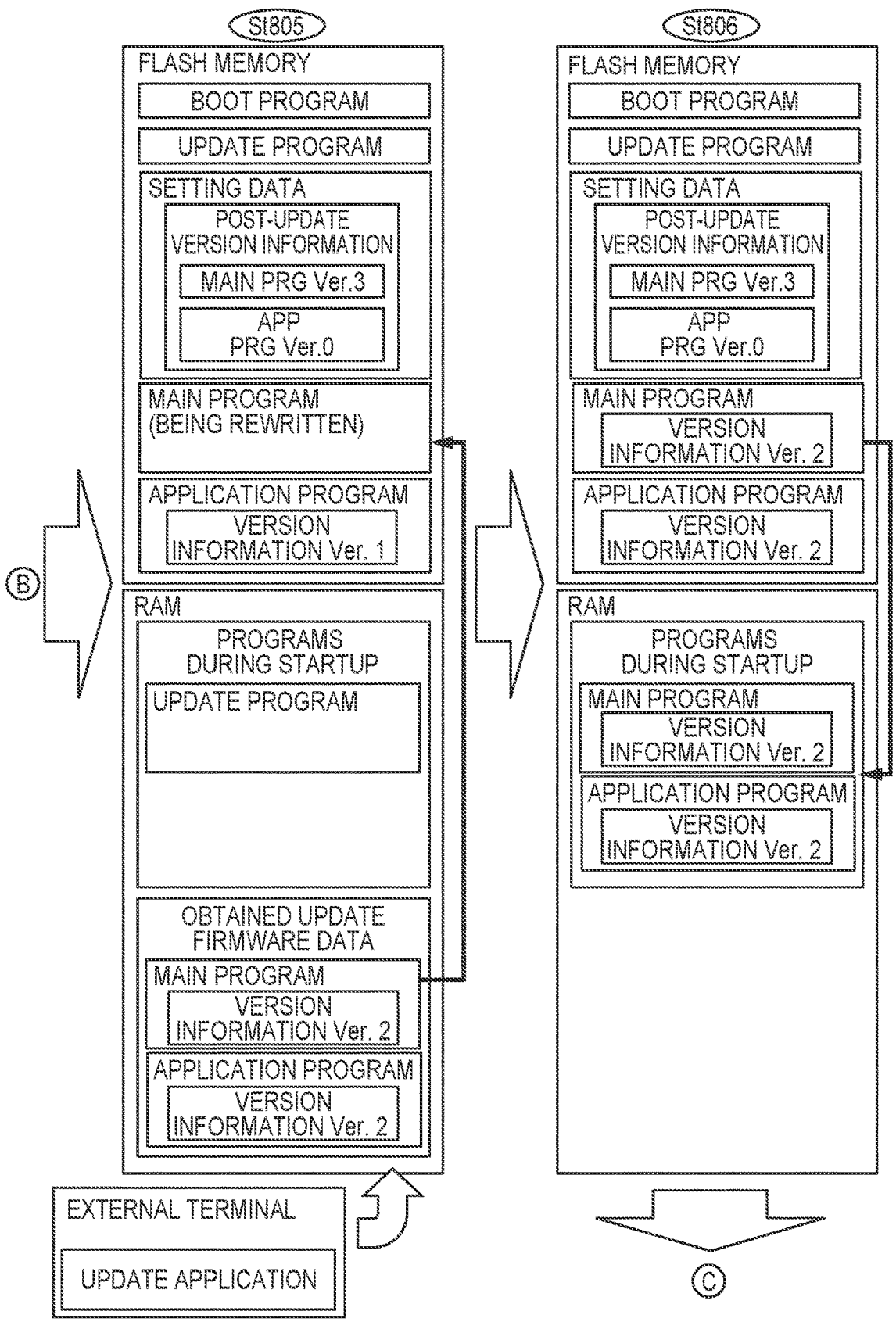
Figure 8D:
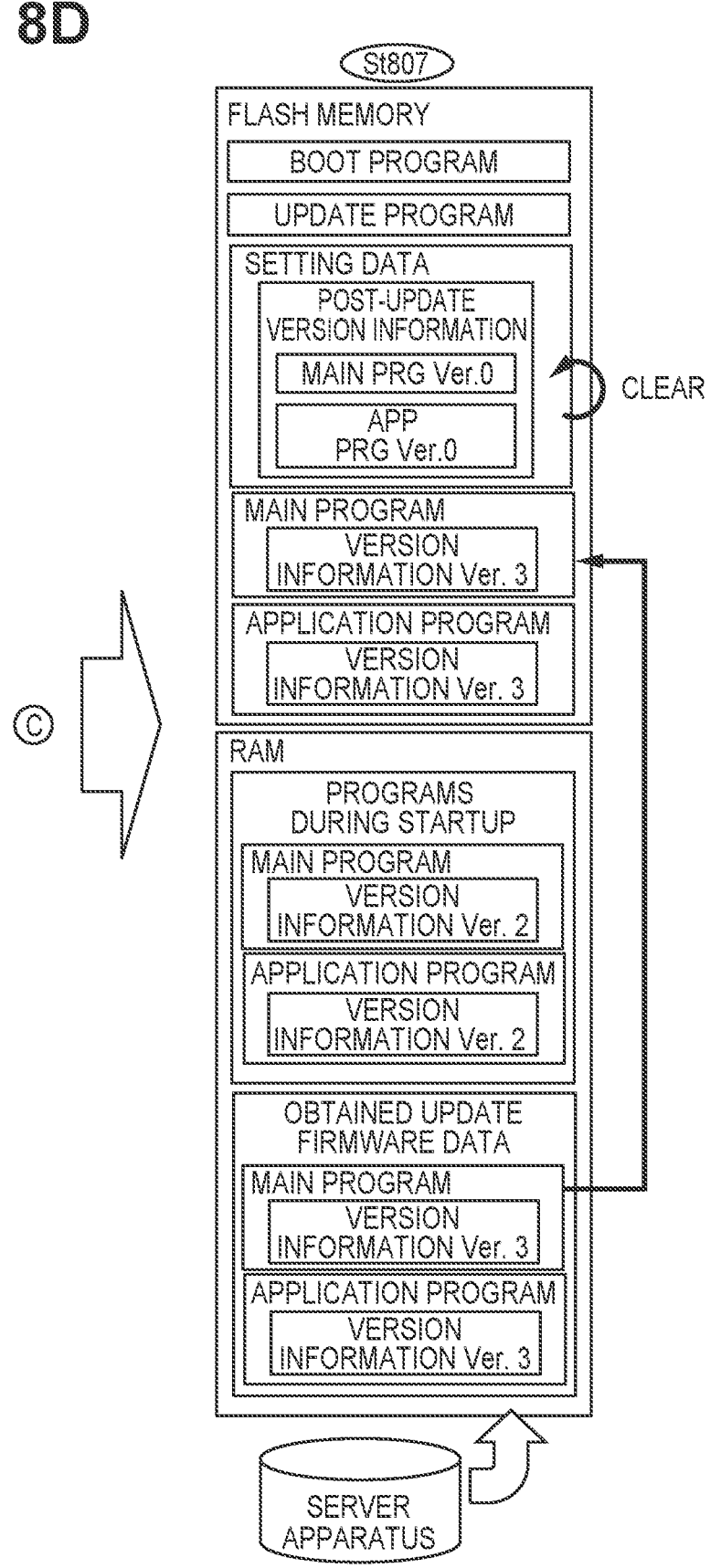

FIGS. 7A and 7B illustrate examples of a sequence of processes for updating the firmware of the information processing apparatus 100 according to the present embodiment. In the respective sequence, an example in which the information processing apparatus 100 obtains the update firmware data 310 from the server apparatus 300 or the external terminal 200 and updates the firmware (main program 122) is illustrated. The application program 129 is also updated together with the main program 122. St801 to St807 indicated in FIGS. 7A and 7B correspond to the states of the storage areas of the flash memory 120 and the RAM 130 illustrated in FIGS. 8A to 8D.

In a state of St801, when the information processing apparatus 100 is started, the boot program 121 loads a version 1 (Ver. 1) of the main program 122 and a Ver. 1 of the application program 129 to the RAM 130. The CPU 110 executes the respective programs loaded to the RAM 130.

As illustrated in FIG. 7A, after receiving an instruction for updating firmware from the user, the information processing apparatus 100 executes the first firmware update process (FIG. 4) with the main program 122. The information processing apparatus 100 transmits a request for obtaining firmware to the server apparatus 300 and obtains the update firmware data 310 from the server apparatus 300. Then, the information processing apparatus 100 sets the version (post-update version) of the main program 122 included in the obtained update firmware data 310 as the post-update version information 126. This sets, as in a state of St802, "Ver. 3" as the post-update version of the main program 122 in the post-update version information 126. "Ver. 0" indicates that the post-update version information 126 has not been set (cleared).

Next, the information processing apparatus 100 starts writing the main program 311. Thus, the information processing apparatus 100 enters a state, such as a state of St803, in which the main program 122 stored in the flash memory 120 is erased and is being rewritten. In the present example, as illustrated in FIG. 7A, it is assumed that the power of the information processing apparatus 100 has been interrupted while the main program 122 is being rewritten. In this case, when the user turns on the power of the information processing apparatus 100, since the startup program type 125 has been set to "update program" in the first firmware update process (step S403), the update program 123 is started by the boot program 121. Thus, the update program 123 is loaded to the RAM 130 as in a state of St804, and the CPU 110 executes the update program 123 on the RAM 130.

The information processing apparatus 100 executes the second firmware update process (FIG. 5) by executing the update program 123. In the present example, the user connects the external terminal 200 to the information processing apparatus 100 so that they are able to communicate with each other and operates the information processing apparatus 100 to issue from the external terminal 200 an instruction for updating firmware to the information processing apparatus 100 (update program 123). If the update application 210 is not installed on the external terminal 200, the user instructs that the update application 210 be obtained. The external terminal 200 obtains the update application 210 from a predetermined download site (website) on the Internet 400 via the Internet 400 and executes the obtained update application 210. The user operates the external terminal 200 to instruct the information processing apparatus 100 to update the firmware with the update application 210. The update firmware data 310 and the update application 210 may be obtained from the download site and held by the external terminal 200.

Upon receiving an instruction for updating firmware from the external terminal 200 (update application 210), the information processing apparatus 100 updates the firmware according to the second firmware update process (FIG. 5). In the present example, a case where the update firmware data is obtained from the external terminal 200 (update application 210) as in a state of St805 but includes a "Ver. 2" program is assumed.

As illustrated in FIG. 7A, the information processing apparatus 100 (update program 123) performs firmware update process using the obtained update firmware data 310. Specifically, the information processing apparatus 100 writes the main program 311 included in the update firmware data 310 (updates the main program 122). When the main program 311 has been written, the main program 311 included in the update firmware data 310 is written (the application program 129 is updated). When the application program 129 has been updated, the information processing apparatus 100 transmits an update completion notification to the external terminal 200 (update application 210) and restarts.

Since the startup program type 125 is set (step S507) at this restart to the "update program" in the second firmware update process, the main program 122 is started by the boot program 121. As part of a startup process by the main program 122, the information processing apparatus 100 executes the process according to the procedure of FIG. 6.

As illustrated in FIG. 7B, when the post-update version of the main program 122 indicated by the post-update version information 126 matches the version of the main program 122 during a startup ("Yes" in step S602), the startup of the main program 122 completes. This corresponds to a case where the version of the main program 311 included in the update firmware data 310 provided from the external terminal 200 (update application 210) to the information processing apparatus 100 is "Ver. 3".

In the present example, since the main program 122 of "Ver. 2" is loaded to the RAM 130 as in a state of St806, this version does not match the post-update version indicated by the post-update version information 126. As described above, when the post-update version of the main program 122 indicated by the post-update version information 126 does not match the version of the main program 122 during a startup ("NO" in step S602), the information processing apparatus 100 executes the first firmware update process (step S605, FIG. 4).

The first firmware update process writes the main program 122 (and the application program 129) to the flash memory 120. Consequently, as in a state of St807, the main program 122 is updated to "Ver. 3" and the post-update version information 126 is cleared to "Ver. 0". Consequently, when the information processing apparatus 100 is restarted, it is determined that the post-update version information 126 has not been set ("No" in step S601) in a startup process by the main program 122, and the startup of the main program 122 completes.

As described above, when the information processing apparatus 100 is started in the state of St806, the information processing apparatus 100 performs the first firmware update process. Therefore, until the update process is complete, the main program 122 of a version (Ver. 2) different from "Ver. 3", which is the post-update version that the user was intending, can be prevented from being used by the user. Further, after restoring the firmware from an error state that accompanies the first firmware update process being abnormally terminated, the firmware (main program 122) can be set as the post-update version (Ver. 3) that the user was intending.

As described above, in the information processing apparatus 100 according to the present embodiment, the CPU 110 obtains the first update firmware data from the server apparatus 300 and holds that data in the RAM 130. Further, the CPU 110 stores the version information of the first update firmware data in the flash memory 120. The CPU 110 performs an update process of updating the firmware of the flash memory 120 using the first update firmware data held in the RAM 130. When an update process is abnormally terminated, the CPU 110 restores the firmware from an error state that accompanies the update process being abnormally terminated, based on the second update firmware data. Further, after the restoration, the CPU 110 decides whether or not to obtain from the server apparatus 300 the update firmware data corresponding to the stored version information based on the version information stored in the flash memory 120.

As described above, in the present embodiment, after the firmware is restored from an error state, it is decided whether or not to obtain, from the server apparatus 300, update firmware data that corresponds to stored version information based on version information that is stored in the flash memory 120. In accordance with that decision, the update firmware data that corresponds to the post-update version that the user was intending is obtained from the server apparatus 300, which makes it possible to update the firmware again. Therefore, after the firmware is restored from an error state that accompanies a process for updating the firmware being abnormally terminated, the post-restoration version of the firmware can be changed to an appropriate version.

In the present embodiment, in the first firmware update process, before starting a firmware update, the CPU 110 sets the type of a program to be started at the time of starting the information processing apparatus 100 to "update program" (restoration program). The CPU 110 further sets the type of a program to be started at the time of starting the information processing apparatus 100 to "firmware" after the firmware has been updated. Thus, when the information processing apparatus 100 is started after a process for updating the firmware has abnormally terminated, it is possible to automatically restore the firmware with the update program 123 (a restoration program).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-179730, filed Nov. 2, 2021, which is hereby incorporated by reference herein in its entirety.

What is claimed is:

1. An information processing apparatus that communicates with a server apparatus via a network, comprising:
a non-volatile storage medium storing firmware;
  a volatile storage medium capable of temporarily holding data; and
  one or more processors connected to the non-volatile storage medium and the volatile storage medium, the one or more processors being configured to execute a program stored in at least one of the non-volatile storage medium and the volatile storage medium to cause the information processing apparatus to:
  obtain first update firmware data from the server apparatus, hold the first update firmware data in the volatile storage medium, and store, separate from the first update firmware data being held in the volatile storage medium, version information of the first update firmware data in the non-volatile storage medium, separate from the volatile storage medium;
  perform an update process of updating the firmware stored in the non-volatile storage medium, using the first update firmware data held in the volatile storage medium;
  in response to an error state has occurred in the update process, restore the firmware from the error state that accompanies the update process being abnormally terminated, based on second update firmware data;
  after restoration of the firmware, determine whether or not a version indicated by the stored version information is different from a version of the restored firmware; and in response to the version indicated by the stored version information is different from the version of the restored firmware, obtain third update firmware data corresponding to the first update firmware data, and update the restored firmware using the third update firmware data.

2. The information processing apparatus according to claim 1, wherein the one or more processors are configured to in response to the version indicated by the stored version information matches the version of the restored firmware, determine not to obtain the third update firmware data corresponding to the first update firmware data, update the restored firmware using the third update firmware data and clear the stored version information.

3. The information processing apparatus according to claim 1, wherein the one or more processors are configured to, store the version information in non-volatile storage medium before a start of the update process in which the first update firmware data is used.

4. The information processing apparatus according to claim 1, wherein the one or more processors are configured to, obtain the second update firmware data from an external apparatus that is connected to the information processing apparatus and restore the firmware stored in the non-volatile storage medium from the error state by updating the firmware using the second update firmware data.

5. The information processing apparatus according to claim 1, wherein the one or more processors are configured to, before starting an update of the firmware, set a type of a program to be started at a startup of the information processing apparatus to a restoration program that performs the restoration, and after completing the update of the firmware, set the type of the program to be started at the startup of the information processing apparatus to the firmware.

6. The information processing apparatus according to claim 5, wherein the one or more processors are configured to, after restoring the firmware from the error state, set the type of the program to be started at the startup of the information processing apparatus to the firmware.

7. The information processing apparatus according to claim 1, wherein the first update firmware data that is obtained from the server apparatus includes firmware of a latest version.

8. The information processing apparatus according to claim 1, wherein the one or more processors are configured to in accordance with execution of restoration of the firmware, restart the information processing apparatus, and based on the restart, determine whether or not the version indicated by the version information stored in the non-volatile storage medium is different from the version of the restored firmware.

9. A method of controlling an information processing apparatus that communicates with a server apparatus via a network, and that comprises a non-volatile storage medium storing firmware, and a volatile storage medium capable of temporarily holding data, the method comprising:

obtaining first update firmware data from the server apparatus, holding the first update firmware data in the volatile storage medium, and storing, separate from the first update firmware data, version information of the first update firmware data in the non-volatile storage medium, separate from the volatile storage medium;

performing an update process of updating the firmware stored in the non-volatile storage medium, using the first update firmware data held in the volatile storage medium;

in response to an error state has occurred in the update process, restoring the firmware from the error state that accompanies the update process being abnormally terminated, based on second update firmware data; and after restoration of the firmware, determining whether or not a version indicated by the stored version information after the restoration is different from a version of the restored firmware; and in response to the version indicated by the stored version information is different from the version of the restored firmware, obtaining third update firmware data corresponding to the first update firmware data, and update the restored firmware using the third update firmware data.

10. A non-transitory computer-readable storage medium storing a computer program for causing a computer to execute a method of controlling an information processing apparatus that comprises a non-volatile storage medium storing firmware, and a volatile storage medium capable of temporarily holding data, the method comprising: obtaining first update firmware data from the server apparatus, holding the first update firmware data in the volatile storage medium, and storing, separate from the first update firmware data, version information of the first update firmware data in the non-volatile storage medium, separate from the volatile storage medium;

performing an update process of updating the firmware stored in the non-volatile storage medium, using the first update firmware data held in the volatile storage medium;

in response to an error state has occurred in the update process, restoring the firmware from the error state that accompanies the update process being abnormally terminated, based on second update firmware data; and after restoration of the firmware, determining whether or not a version indicated by the stored version information after the restoration is different from a version of the restored firmware; and in response to the version indicated by the stored version information is different from the version of the restored firmware, obtaining third update firmware data corresponding to the first update firmware data, and update the restored firmware using the third update firmware data.

* * * * *